(12) United States Patent
Bhardwaj

(10) Patent No.: US 9,722,254 B2
(45) Date of Patent: Aug. 1, 2017

(54) GRAPHENE APPLICATION IN BATTERY

(71) Applicant: X Development LLC, Mountain View, CA (US)

(72) Inventor: Ramesh C. Bhardwaj, Fremont, CA (US)

(73) Assignee: X Development LLC, Mountain View, CA (US)

( * ) Notice: Subject to any disclaimer, the term of this patent is extended or adjusted under 35 U.S.C. 154(b) by 91 days.

(21) Appl. No.: 14/810,151

(22) Filed: Jul. 27, 2015

(65) Prior Publication Data

US 2017/0033365 A1 Feb. 2, 2017

(51) Int. Cl.
*H01M 4/13* (2010.01)
*H01M 4/78* (2006.01)
*H01M 4/04* (2006.01)
*H01M 4/38* (2006.01)
*H01M 4/525* (2010.01)
(Continued)

(52) U.S. Cl.
CPC ........... *H01M 4/78* (2013.01); *H01M 4/0404* (2013.01); *H01M 4/0407* (2013.01); *H01M 4/131* (2013.01); *H01M 4/382* (2013.01); *H01M 4/525* (2013.01); *H01M 4/663* (2013.01); *H01M 4/70* (2013.01); *H01M 10/052* (2013.01); *H01M 10/0525* (2013.01); *H01M 10/0562* (2013.01); *H01M 4/667* (2013.01)

(58) Field of Classification Search
CPC ...... H01M 4/366; H01M 4/663; H01M 4/133; H01M 10/052; H01M 4/625; H01M 10/0525; H01M 2300/002; H01M 2300/0094; B82Y 30/00; B82Y 40/00; Y02E 60/122; Y02P 70/54
See application file for complete search history.

(56) References Cited

U.S. PATENT DOCUMENTS 8,551,650 B2 10/2013 Kung et al.
8,951,675 B2 2/2015 Bhardwaj et al.
(Continued)

FOREIGN PATENT DOCUMENTS

WO 2012138302 10/2012
WO 2014078807 5/2014

OTHER PUBLICATIONS

International Search Report, International Application No. PCT/US2016/043990, mailed Sep. 26, 2016.

*Primary Examiner* — Patrick Ryan
*Assistant Examiner* — Ben Lewis
(74) *Attorney, Agent, or Firm* — McDonnell Boehnen Hulbert & Berghoff LLP

(57) ABSTRACT

This disclosure relates to a battery and a method for its manufacture. The method of manufacture may include forming a cathode layer proximate to a cathode current collector. The method further includes forming an electrolyte layer proximate to the cathode layer and an anode layer proximate to the electrolyte layer. The method additionally includes forming an anode current collector layer proximate to the anode layer. At least one of the cathode current collector layer or the anode current collector layer includes a plurality of graphene monolayers. The method yet further includes determining a stepped arrangement of the graphene monolayers; and patterning at least a portion of the plurality of graphene monolayers according to the stepped arrangement.

19 Claims, 13 Drawing Sheets

(51) Int. Cl.
*H01M 4/66* (2006.01)
*H01M 10/052* (2010.01)
*H01M 10/0525* (2010.01)
*H01M 10/0562* (2010.01)
*H01M 4/131* (2010.01)
*H01M 4/70* (2006.01)

(56) References Cited

U.S. PATENT DOCUMENTS

| | | |
|---|---|---|
| 9,017,867 B2 | 4/2015 | Liu et al. |
| 2009/0246636 A1* | 10/2009 | Chiang ................ H01M 2/166 |
| | | 429/231.95 |
| 2011/0171095 A1* | 7/2011 | Mepsted ................ C01B 25/45 |
| | | 423/277 |
| 2013/0059178 A1* | 3/2013 | Ihara ................ H01M 10/052 |
| | | 429/61 |
| 2013/0071751 A1 | 3/2013 | Tajima et al. |
| 2013/0071762 A1 | 3/2013 | Tajima et al. |
| 2014/0017562 A1 | 1/2014 | Wang et al. |
| 2014/0030600 A1* | 1/2014 | Kwon ................ H01L 31/02246 |
| | | 429/231.8 |
| 2015/0086881 A1 | 3/2015 | Zhamu et al. |
| 2015/0103469 A1 | 4/2015 | Lee et al. |

\* cited by examiner

GRAPHENE APPLICATION IN BATTERY

BACKGROUND

Batteries include an anode, cathode, and an electrolyte. In some batteries, one or more current collectors may be positioned adjacent to the anode and/or the cathode. Lithium ion batteries offer higher energy density than other battery chemistries, such as alkaline-type batteries. Such lithium ion batteries may be used to power a variety of mobile and fixed devices, including smartphones, tablets, computers, electric cars, etc.

SUMMARY

A battery may include current collector, cathode, anode, and electrolyte materials. The current collector may include a plurality of graphene monolayers. The battery may be formed in a three-dimensional manner by patterning the plurality of graphene monolayers. For example, the graphene monolayers may be patterned so as to form a stepped arrangement. By structuring the battery in such a manner, various characteristics of the battery may be improved. For example, the contact resistance may be reduced and surface area between the current collector and the anode and/or the cathode may be increased.

In a first aspect, method of manufacturing a battery is provided. The method includes forming a cathode layer proximate to a cathode current collector and forming an electrolyte layer proximate to the cathode layer. The method also includes forming an anode layer proximate to the electrolyte layer and forming an anode current collector layer proximate to the anode layer. At least one of the cathode current collector layer or the anode current collector layer includes a plurality of graphene monolayers. The method additionally includes determining a stepped arrangement of the graphene monolayers and patterning at least a portion of the plurality of graphene monolayers according to the stepped arrangement.

In a second aspect, a battery is provided. The battery includes a cathode layer proximate to a cathode current collector and an electrolyte layer proximate to the cathode layer. The battery also includes an anode layer proximate to the electrolyte layer and an anode current collector layer proximate to the anode layer. At least one of the cathode current collector layer or the anode current collector layer includes a plurality of graphene monolayers having a stepped arrangement. The stepped arrangement provides a higher surface area to volume ratio at an interface between a patterned portion of the plurality of graphene monolayers and at least one of the cathode layer or the anode layer compared to an interface between an unpatterned portion of the plurality of graphene monolayers and the at least one of the cathode layer or the anode layer.

Other aspects, embodiments, and implementations will become apparent to those of ordinary skill in the art by reading the following detailed description, with reference where appropriate to the accompanying drawings.

DETAILED DESCRIPTION

I. Overview

Figure 1:
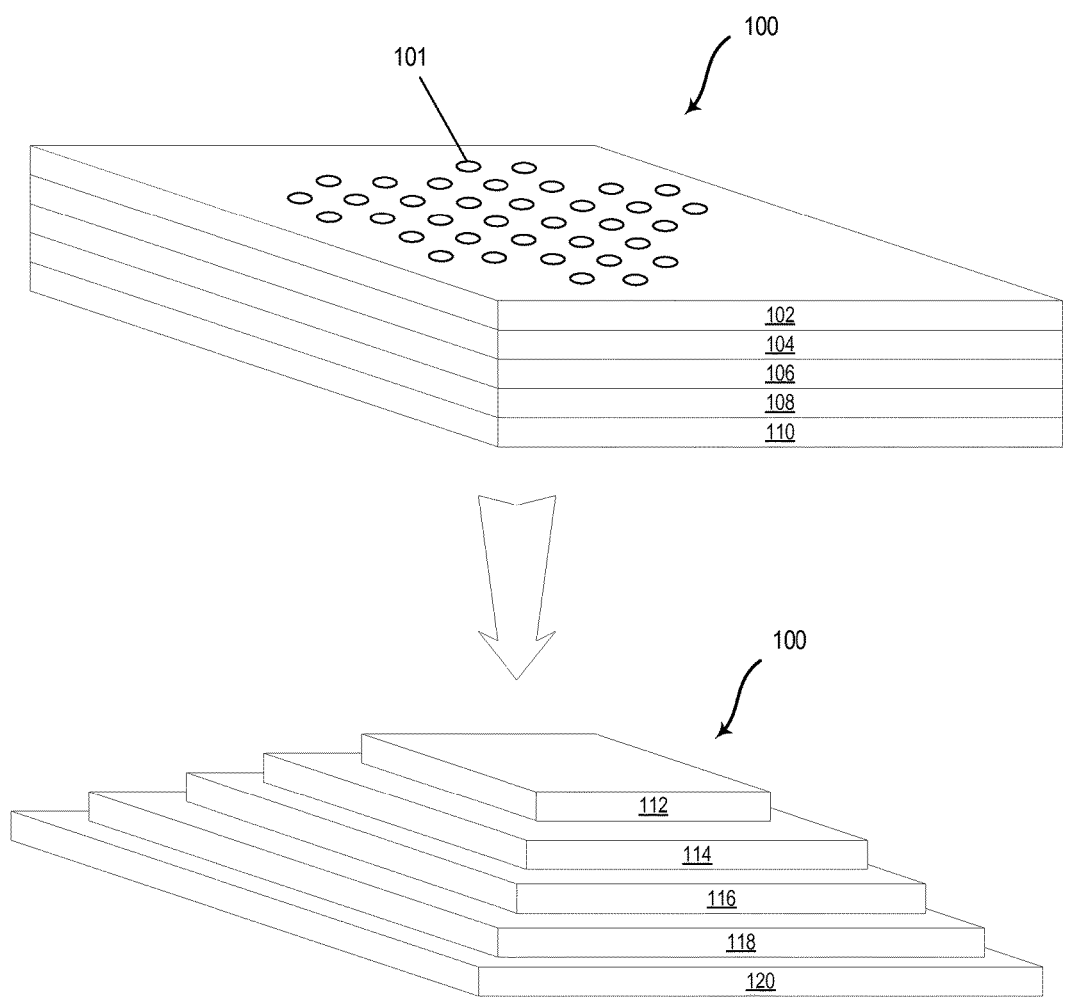
FIG. 1 illustrates a perspective view of a plurality of graphene monolayers, according to an example embodiment.

Battery structures and methods of manufacturing such batteries are disclosed herein. An example battery may be a primary (non-rechargeable) or a secondary (rechargeable) battery. The battery may include a positive and negative electrode, which may correspond to a cathode and anode, respectively. The positive electrode may include a reduction potential and the negative electrode may include an oxidation potential. The sum of these potentials may determine, at least in part, the standard cell voltage of the battery. The battery may further include a liquid or gel electrolyte that may accommodate a flow of ions between the anode and cathode.

During battery discharge, the anode may release electrons to flow through an external circuit and release ions that flow through the electrolyte to the cathode. In rechargeable batteries, these flows can be reversed so as to replace material on the negative electrode.

Graphene is a two-dimensional atomic-scale arrangement of carbon atoms that includes a planar hexagonal lattice arrangement. Each carbon atom in a graphene sheet has four bonds; three in-plane σ bonds and one out-of-plane π bond. Graphene has various electrical, mechanical, thermal, and electrochemical properties that may be leveraged in batteries. For example, graphene exhibits a high electron mobility and low electrical sheet resistivity. Furthermore, graphene may exhibit high tensile sheet strength and thermal conductivity comparable to diamond. It should be noted that while three-dimensional carbon-based materials have various names and accepted usages (e.g. graphite, carbon sheets/layers, carbon rings, etc.), herein the term graphene will be used to describe one or more atomic layers of carbon arranged in a planar, hexagonal lattice. Further, graphene may be produced using various methods including cleaving, exfoliation, chemical reduction, sonication, epitaxial growth, catalyzed growth, etc.

In an example embodiment, a battery may include a current collector that is formed from many thin sheets (e.g., atomic layers) of graphene. Further, in such a current collector, the graphene sheets may have stepped arrangement or profile. To illustrate, in some embodiments, the atomic arrangement of graphene sheets making up the current collector may resemble a terraced hillside. The collective height of the stepped arrangement of graphene sheets may vary gradually or abruptly across the current collector. That is, the stepped arrangement may include a variety of "step heights" that may range from a single graphene monolayer step to steps that have heights of hundreds or thousands of graphene monolayers, or more. As individual graphene layers may have a thickness of 3.35 Å, such a stepped arrangement of graphene sheets may collectively approximate a curved surface. Further, since a graphene current collector can be used as a substrate for a battery, a stepped graphene current collector may be used to provide a curved battery.

In an example embodiment, the battery may be a lithium-ion or lithium-polymer battery. For instance, the cathode layer of the curved battery may include lithium cobalt oxide ($LiCoO_2$), the anode layer may include lithium metal (Li), and the electrolyte layer may include lithium phosphorous oxynitride (LiPON). Other battery chemistries and materials are possible. The battery may be formed as a thin film battery, a jelly roll battery, or another type of battery.

In an example embodiment, the battery is a thin film solid state battery. Cathode materials of such a thin film solid state battery may include metal oxides such as lithium cobalt oxide ($LiCoO_2$ or LCO). Other cathode materials may include lithium manganese oxide (LMO), lithium iron phosphate (LFP), or lithium nickel manganese cobalt oxide (NMC). The cathode materials may be deposited in various ways, including pulsed laser deposition (PLD), magnetron sputtering, physical vapor deposition (PVD) and chemical vapor deposition (CVD). Anode materials of the thin film solid state battery may include lithium metal. Other anode materials are possible.

Example embodiments include an electrolyte, which may allow and/or regulate ion conduction between the cathode and anode. The electrolyte may include an inorganic solid-state material such as lithium phosphorous oxynitride (Li-PON). In some embodiments, the LiPON may be deposited by RF magnetron sputtering or PVD. For example, PVD of LiPON may include exposing a target of lithium phosphate to plasma in a nitrogen environment. Alternatively or additionally, the electrolyte may include a different material. The electrolyte may be able to conform to a shape of the underlying layers.

In an example embodiment, the aforementioned elements of the thin film solid state battery may be patterned, removed, and/or deposited in a selective manner. That is, the materials need not be deposited in a blanket layer across an entire area of a given substrate. Instead, the respective materials may be deposited and/or formed in selected areas of the substrate in an additive or subtractive fashion. Alternatively, the materials may be deposited in a blanket layer fashion and then selectively removed using various techniques such as photolithography and laser scribing.

Such a battery may be manufactured via any number of processes, steps, or methods. In an example embodiment, the method of manufacture may include forming a cathode current collector, cathode, electrolyte, anode, and anode current collector in proximity to one another so as to form a battery. In such a scenario, at least one of the cathode current collector or the anode current collector includes a plurality of graphene monolayers. In some embodiments, the graphene monolayers are initially formed on a copper foil or another type of metallic catalyst. The method may further include patterning a portion of the plurality of graphene monolayers. The patterning may include selective removal of some of the graphene monolayers (e.g. via e-beam lithography or deep-UV lithography followed by an etch process) or a physical impression (e.g. nanoimprint lithography, etc.). Such patterning may form a stepped arrangement of the graphene monolayers.

The stepped arrangement of graphene monolayers may provide a higher surface area with an adjacent cathode or anode layer compared to a substantially flat arrangement of graphene monolayers. As such, a surface area to volume ratio may be increased by patterning the portion of graphene monolayers. In other words, an interface between the patterned portion of graphene monolayers and at least one of the anode or the cathode may have a higher surface to volume ratio as compared to an interface between an unpatterned portion of graphene monolayers and the at least one anode or cathode.

Alternatively or additionally, the patterned portion may provide a curved substrate that may provide a curved shape for at least a portion of the battery. For example, by selectively removing a portion of graphene monolayers, the remaining portion of the graphene monolayers may provide a substrate upon which to form the other layers of the battery. In other words, at least one surface of the battery may be curved with respect to an axis substantially perpendicular to the plurality of graphene monolayers.

II. Example Batteries

In an example embodiment, a battery may include a cathode layer proximate to a cathode current collector layer, an electrolyte proximate to the cathode layer, and an anode layer proximate to the electrolyte layer. An anode current collector layer may be proximate to the anode layer. At least one of the cathode current collector layer or the anode current collector layer includes a plurality of graphene monolayers. The graphene monolayers have a stepped arrangement. In some embodiments, the stepped arrangement provides a higher surface area to volume ratio at an interface between a patterned portion of the plurality of graphene monolayers and the cathode and/or the anode layer compared to an interface between an unpatterned portion of the plurality of graphene monolayers and the cathode and/or the anode.

As described elsewhere herein, the battery may be a thin film solid state battery. The battery may furthermore be a lithium ion or lithium polymer battery. The cathode current collector and the anode current collector may include a material that functions as an electrical conductor. Furthermore, the cathode current collector and the anode current collector may be configured to be block lithium ions and various oxidation products ($H_2O$, $O_2$, $N_2$, etc.). In other words, the cathode current collector and the anode current collector may include materials that have minimal reactivity with lithium. For example, the cathode current collector and the anode current collector may include, in addition to the graphene materials described herein, one or more of: Au, Ag, Al, Cu, Co, Ni, Pd, Zn, and Pt. Alloys of such materials are also contemplated herein. In some embodiments, an adhesion layer material, such as Ti may be utilized. In other words, the current collectors may include multiple layers, e.g. TiPtAu. Other materials are possible to form the cathode current collector and the anode current collector. For example, the cathode current collector and/or the anode current collector may be formed from carbon nanotubes and/or metal nanowires. It should be understood that the cathode current collector and the anode current collector need not have the same chemical composition and/or shape.

The cathode current collector and the anode current collector may be deposited using RF or DC sputtering of source targets. Alternatively, PVD, electron beam-induced deposition or focused ion beam deposition may be utilized to form the cathode current collector and the anode current collector.

In some embodiments, the cathode current collector and the anode current collector may be formed by depositing a blanket material layer on a substrate. The blanket material layer may subsequently be patterned, for example by a masking and etching method. Alternatively, the blanket material layer may be patterned by ablating selected areas using a laser.

In other embodiments, the cathode current collector and the anode current collector may be formed on the substrate by depositing through a hard shadow mask and/or a photolithography-defined resist mask. Alternatively, the cathode current collector and the anode current collector may be deposited in separate steps using multiple masks. Other ways to define the current collectors are contemplated within the scope of the present disclosure.

The cathode of the battery may include a material such as lithium cobalt oxide ($LiCoO_2$, or LTO). Additionally or alternatively, the cathode may include lithium manganese oxide ($LiMn_2O_4$, or LMO), lithium nickel manganese cobalt oxide ($LiNi_xMn_yCo_zO_2$, or NMC), or lithium iron phosphate ($LiFePO_4$). Other cathode materials are possible. Furthermore, the cathode may be coated with aluminum oxide and/or another ceramic material, which may allow the battery to operate at higher voltages and/or provide other performance advantages.

In example embodiments, LTO may be deposited using RF sputtering or PVD, however other deposition techniques may be used to form the cathode. The deposition of the cathode may occur as a blanket over the entire substrate. A subtractive process of masking and etching may remove cathode material where unwanted. Alternatively, the deposition of the cathode may be masked using a photolithography-defined resist mask. In an example embodiment, the cathode current collector is deposited through a shadow mask onto the substrate. Subsequently, the material of the cathode may be deposited through an identical or similar shadow mask onto the cathode current collector.

The anode may include a material such as lithium metal or silicon-containing materials. Additionally or alternatively, the anode may include lithium titanate ($Li_4Ti_5O_{12}$). Li-free anode materials such as graphite, carbon, silicon, or other solid state battery anode materials are also contemplated herein. The material of anode may be deposited using evaporation, sputtering, or other deposition techniques.

The anode may be selectively formed on the substrate in different ways. For example, the material of anode may be deposited as a blanket over the entire substrate and selectively etched or otherwise removed. Alternatively, the anode material may be masked during deposition. In an example embodiment, the anode current collector is deposited through a shadow mask onto the substrate. Subsequently, the material of the anode is deposited through an identical or similar shadow mask onto the anode current collector.

The electrolyte may be disposed between the cathode and the anode. The electrolyte may include a material such as lithium phosphorous oxynitride (LiPON). Additionally or alternatively, the electrolyte may include a flexible polymer and/or gel electrolyte material. Generally, the electrolyte may be configured to permit ion conduction between the anode and the cathode. In an example embodiment, the LiPON material may allow lithium ion transport while preventing a short circuit between the anode and the cathode. Other wet, dry, and gel electrolyte materials are contemplated within the scope of the present disclosure.

It should be understood that many different configurations of batteries are contemplated herein. For example, "single cell" configurations and multi-cell configurations are possible. In other words, the battery may be connected in a parallel and/or series configuration with similar or different batteries or circuits. Several instances of the battery may be connected in series to in an effort to increase the open circuit voltage of the battery, for instance. Similarly, several instances of the battery may be connected in parallel to increase capacity (amp hours). In other embodiments, the battery may be connected in configurations involving other batteries. In an example embodiment, a plurality of instances of the battery may be configured in a planar array on the substrate. Other arrangements are possible.

The battery may include a substrate. The substrate may include a variety of materials. For example, the substrate may include one or more of: a silicon wafer, a plastic, a polymer, paper, fabric, glass, metal, or a ceramic material. In some embodiments, the plurality of graphene monolayers may be grown on a metal substrate, such as copper or silver foil. Other substrate materials are possible.

In some embodiments, the battery may include an encapsulation. The encapsulation may include a material configured to protect and stabilize the underlying elements of the battery. For example, the encapsulation may include an inert material, an insulating material, a passivating material, and/or a physically- and/or chemically-protective material. In an embodiment, the encapsulation may include a multilayer stack which may include alternating layers of a polymer (e.g. parylene, photoresist, etc.) and a ceramic material (e.g. alumina, silica, etc.) Additionally or alternatively, the encapsulation may include silicon nitride (SiN). Encapsulation may include other materials.

In an example embodiment, the battery may occur in a stacked arrangement. That is, instances of the battery may be placed on top of one another. The encapsulation may provide a planarization layer for a further substrate and accompanying battery materials. Alternatively, the battery materials may be grown and/or patterned directly on the encapsulation without a further substrate. In such a way, multiple instances of the battery may be formed on top of one another.

FIG. 1 illustrates a perspective view of a plurality of graphene monolayers 100, according to an example embodiment. For example, graphene monolayers 102, 104, 106, 108, and 110 may represent several atomic layers of graphene material. Each graphene monolayer (e.g. graphene monolayers 102, 104, 106, 108, and 110) may consist of carbon atoms 101 arranged in a hexagonal planar lattice as described elsewhere herein. For example, an individual graphene monolayer may have a thickness of 3.35 Å. Collectively, graphene monolayers may be grown, assembled, and/or stacked so as to form any thickness. It is understood that the figures illustrated herein are not drawn to scale and that example embodiments may include any number of graphene monolayers or portion thereof.

At least some of graphene monolayers 102, 104, 106, 108, and 110 may be patterned. That is, at least a portion of the graphene monolayers may be removed, reformed, reshaped, or rearranged via chemical, electrical, and/or mechanical means according to a stepped arrangement. In other words, graphene monolayers 102, 104, 106, 108, and 110 may be reshaped to form graphene monolayers 112, 114, 116, 118, and 120. As illustrated in FIG. 1, graphene monolayers 112, 114, 116, 118, and 120 may form a three-dimensional pyramidal shape. However, other shapes are possible.

Figure 2A:
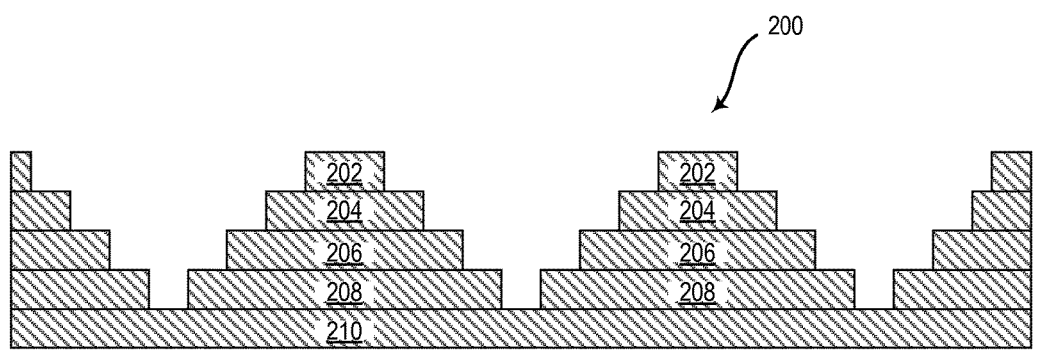
FIG. 2A illustrates a cross-sectional view of a plurality of graphene monolayers, according to an example embodiment.
Figure 2B:
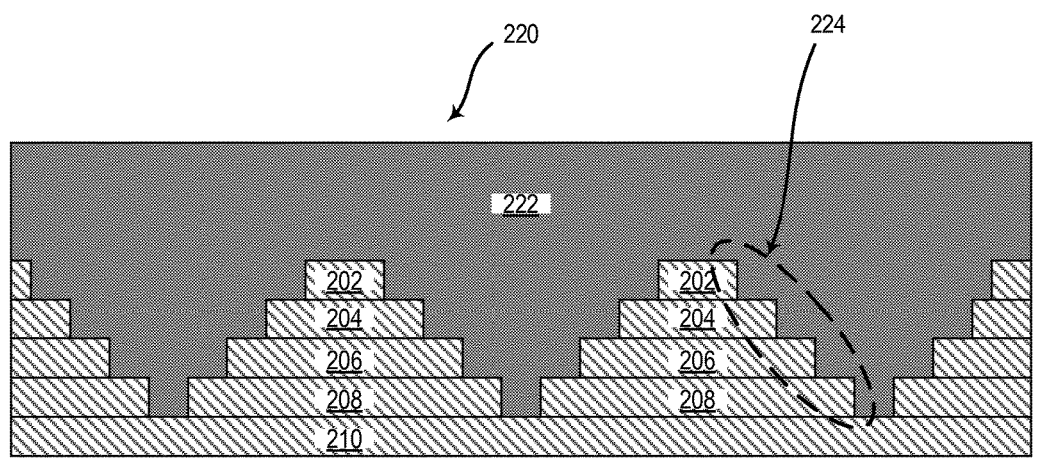
FIG. 2B illustrates a cross-sectional view of a plurality of graphene monolayers, according to an example embodiment.

FIGS. 2A to 2D illustrate cross-sectional views of a plurality of graphene monolayers according to example embodiments. For example, FIG. 2A illustrates a plurality of graphene monolayers 200. Similar to FIG. 1, at least some of graphene monolayers 202, 204, 206, 208, and 210 may be patterned so as to form a pyramidal shape and/or a grooved surface by patterning the plurality of graphene monolayers 200. As such, scenario 220 of FIG. 2B illustrates a battery material 222 forming an interface 224 with the graphene monolayers 202, 204, 206, 208, and 210. In such a scenario, the interface 224 may provide a higher surface area than an unpatterned graphene surface.

The higher surface area at interface 224 may provide one or more benefits. For example, the higher surface area may provide better mechanical coupling to the battery material 222. Furthermore, the higher surface area may provide better electrical contact based on a fixed current density. Additionally, the greater surface area may provide increased thermal conduction of heat away from the interface 224. Other benefits may be possible due, at least in part, to the higher surface area at interface 224.

Figure 2C:
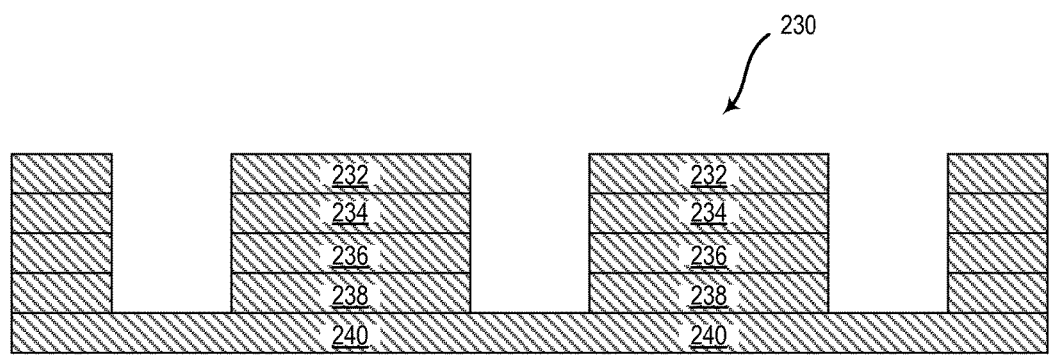
FIG. 2C illustrates a cross-sectional view of a plurality of graphene monolayers, according to an example embodiment.

FIG. 2C illustrates a plurality of graphene monolayers 230, according to an example embodiment. In such a scenario, graphene monolayers 232, 234, 236, 238, and 240 may provide a plurality of columnar protrusions and/or a grooved or trenched cross-section of the plurality of graphene monolayers 230. That is, similar to FIG. 2B, at least a portion of the plurality of graphene monolayers 230 may protrude into another battery material (e.g. an anode, a cathode, and/or a battery packaging material). As such, the surface area between the plurality of graphene monolayers 230 and the other battery material may be increased compared to a planar interface between the same materials. In some embodiments, the columnar protrusions and/or trench structures may be formed using a lithography technique in combination with an anisotropic etch (e.g. a dry plasma etch).

In other example embodiments, the graphene monolayers 232, 234, 236, and 238 may be formed using a "bottom-up" technique. That is, at least some of the plurality of graphene monolayers 230 may grown or assembled using a growth template. The growth template may be a graphene layer pre-patterned with $SiO_2$ or another material. The further graphene layers may be grown on the growth template during a subsequent CVD deposition, among other methods.

Figure 2D:
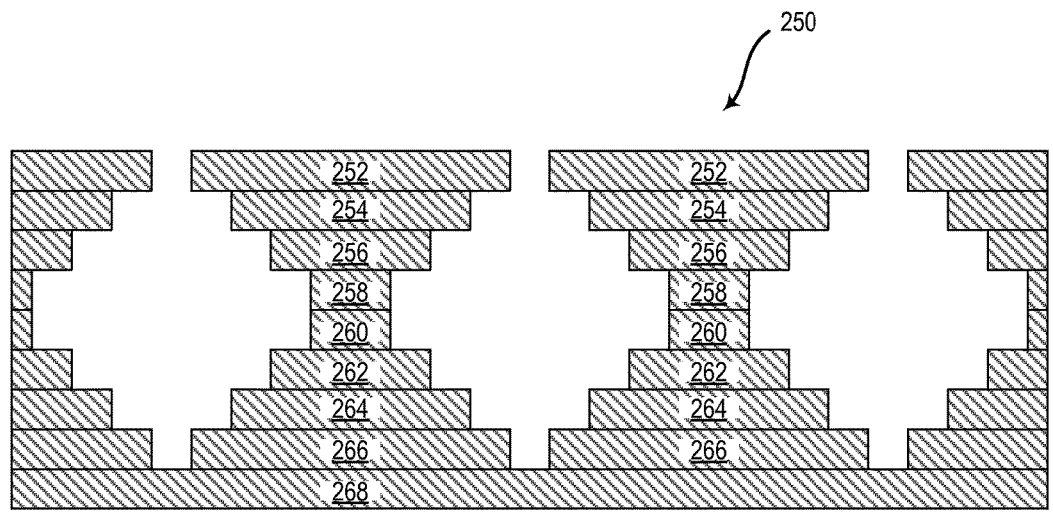
FIG. 2D illustrates a cross-sectional view of a plurality of graphene monolayers, according to an example embodiment.

FIG. 2D illustrates a plurality of graphene monolayers 250, according to an example embodiment. For example, graphene monolayers 252, 254, 256, 258, 260, 262, 264, 266, and 268 may provide an "undercut" space within the plurality of graphene monolayers that may incorporate another battery material. The undercut spaces may be created by a lithography technique in combination with an isotropic etch (e.g. a wet chemical etch). Other ways to create such undercut structures are possible.

As described elsewhere herein, the patterned graphene monolayers may be formed and/or positioned adjacent to one or more other battery materials. For example, the patterned graphene monolayers may be part of a current collector and the adjacent battery material may include a cathode or an anode of the battery. In other examples, the patterned graphene monolayers may be adjacent to a package of the battery and/or adjacent to a package of a mobile computing device.

III. Example Methods

FIGS. 3A to 3G illustrate cross-sectional views of a battery manufacturing scenario 300, according to an example embodiment. FIG. 3H illustrates a perspective view of a battery manufacturing scenario 300, according to an example embodiment. The battery manufacturing scenario 300 may include various blocks or steps. The blocks or steps may be carried out individually or in combination. The blocks or steps may be carried out in any order and/or in series or in parallel. Further, blocks or steps may be omitted or added. FIGS. 3A to 3H may illustrate some or all of the blocks of method 600 and/or the results of carrying out the blocks of method 600, as illustrated and described with reference to FIG. 6.

Figure 3A:
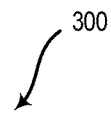
FIGS. 3A to 3G illustrate cross-sectional views of a battery manufacturing scenario, according to an example embodiment.
Figure 3A:
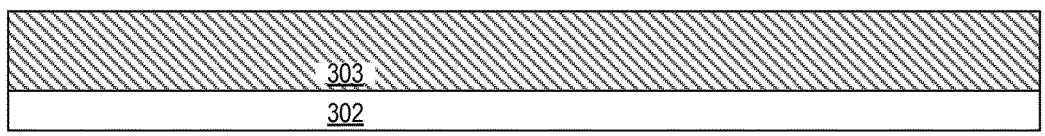

FIG. 3A illustrates a substrate 302 and a plurality of unpatterned graphene monolayers 303. In an example embodiment, the plurality of unpatterned graphene monolayers may be formed initially on substrate 302 that may include copper foil. The unpatterned graphene monolayers 303 may undergo a patterning process as described elsewhere herein. For example, a lithographic process in combination with a dry etch process may be used to form a patterned plurality of graphene layers. In the present example, the unpatterned graphene monolayers 303 comprise at least part of the anode current collector. However, the unpatterned graphene monolayers 303 may additionally or alternatively comprise at least part of the cathode current collector.

Figure 3B:
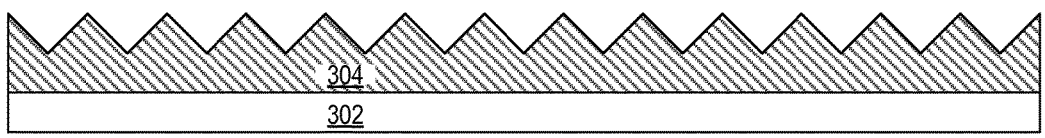

FIG. 3B illustrates a plurality of patterned graphene monolayers 304, which may have a cross-section similar or identical to the plurality of graphene monolayers 200, illustrated and described in reference to FIGS. 2A and 2B. As noted elsewhere herein, while FIGS. 3B to 3H illustrate the patterned graphene monolayers 304 having a "sawtooth" cross-section, other cross-sectional shapes are possible, all of which are contemplated in the present disclosure.

Figure 3C:
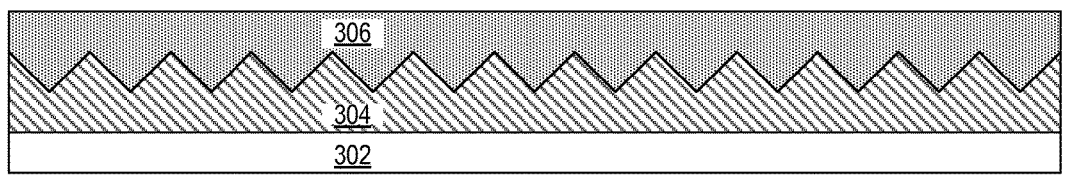

FIG. 3C illustrates an anode 306. The material making up the anode 306 may be formed (e.g. applied, grown, sprayed, rolled, etc.) directly onto the patterned graphene monolayers 304. As such, the interface between the anode 306 and the patterned graphene monolayers 304 may include a much greater surface area per unit volume than if the graphene monolayers were not patterned. As used herein, the interface may include the surface at which the graphene monolayers and the anode 306 are adjacent to one another. The interface may alternatively or additionally include a volume that encompasses the graphene and anode material within a given distance from the interfacial surface. For example, the surface area per unit volume of the interface may be 25% to 200% greater than that of a similar anode interface with an unpatterned graphene layer. The anode 306 may include lithium metal (Li), graphite, and/or silicon-containing materials (e.g. silicon monoxide).

Figure 3D:
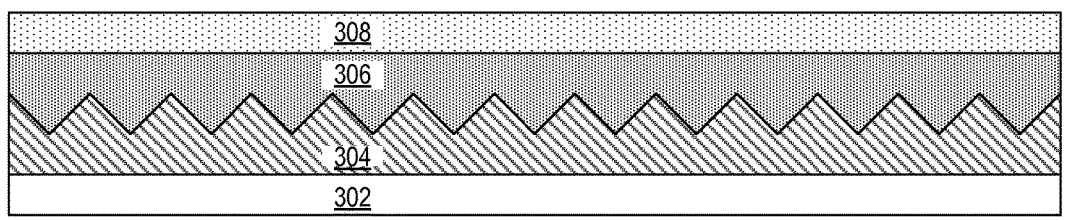

FIG. 3D illustrates a separator 308. The 308 may be formed adjacent to the anode 306. The separator 308 may include an insulating material such as polyethylene (PE), polypropylene or poly vinyl chloride (PVC). Other materials or combinations of materials are possible for separator 308. The separator 308 may incorporate a liquid, gel, or solid electrolyte material configured to promote or enable ion transport between the anode 306 and the cathode of the battery. For example, the electrolyte may include lithium tetrafluoroborate ($LiBF_4$), lithium hexafluorophosphate ($LiPF_6$), and/or other electrolyte materials.

Figure 3E:
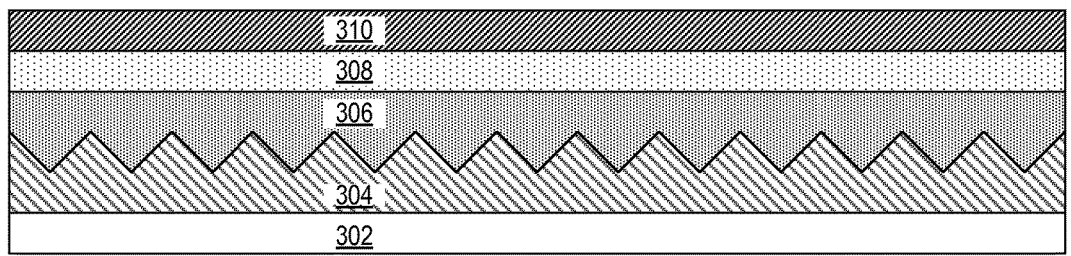

FIG. 3E illustrates a cathode 310 formed adjacent to the separator 308. As described elsewhere herein, the cathode may include one or more of a variety of materials. For instance, the cathode 310 may include lithium nickel manganese cobalt oxide (NMC, $LiNiMnCoO_2$), lithium cobalt oxide (LCO, $LiCoO_2$), or lithium nickel cobalt aluminum oxide (LCA, $LiNiCoAlO_2$). Other cathode materials are possible. The cathode layer thickness may vary between 10-30 microns, although other thicknesses are possible.

Figure 3F:
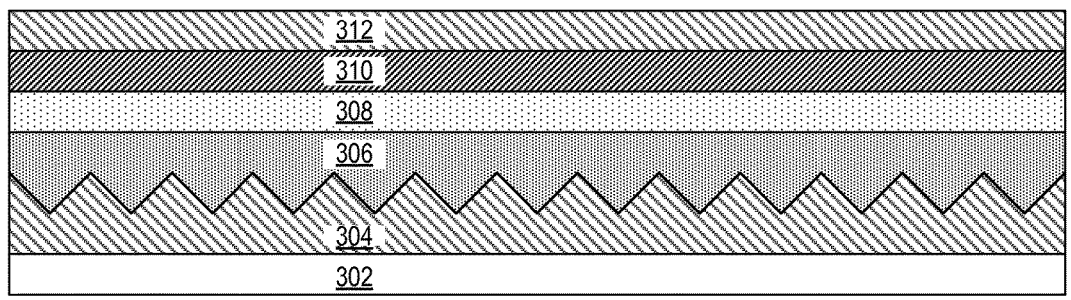
Figure 3G:
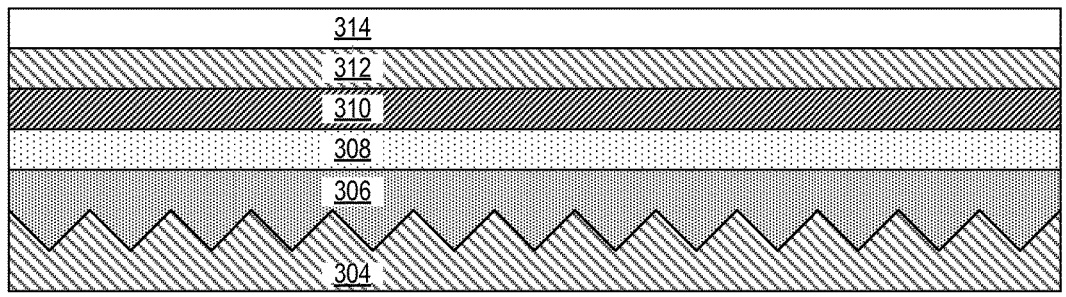
Figure 3H:
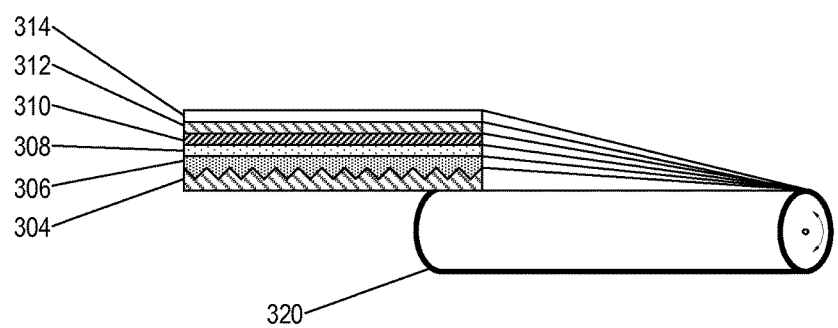
FIG. 3H illustrates a perspective view of a battery manufacturing scenario, according to an example embodiment.

FIG. 3F illustrates a cathode current collector 312 formed adjacent to the cathode 310. FIG. 3G includes a second separator 314 formed adjacent to the cathode current collector 312. The second separator 314 may include an insulating material such as polyethylene (PE), polypropylene or poly vinyl chloride (PVC). Other materials or combinations of materials are possible for the second separator 314.

FIG. 3H illustrates formation of a jelly roll 320. The jelly roll 320 may be cylindrically shaped or another shape. The formation of the jelly roll 320 may include a process that rolls the above-mentioned layers around a shaped core. The jelly roll 320 may be further packaged and/or processed (e.g. soaked to introduce electrolyte, initially charged, etc.).

FIGS. 4A to 4F illustrate cross-sectional views of a battery manufacturing scenario 400, according to an example embodiment. FIGS. 4A to 4F may relate to a thin film battery manufacturing scenario. The battery manufacturing scenario 400 may include various blocks or steps. The blocks or steps may be carried out individually or in combination. The blocks or steps may be carried out in any order and/or in series or in parallel. Further, blocks or steps may be omitted or added. FIGS. 4A to 4F may illustrate some or all of the blocks of method 600 and/or the results of carrying out the blocks of method 600, as illustrated and described with reference to FIG. 6.

Figure 4A:
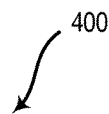
FIGS. 4A to 4F illustrate cross-sectional views of a battery manufacturing scenario, according to an example embodiment.
Figure 4A:
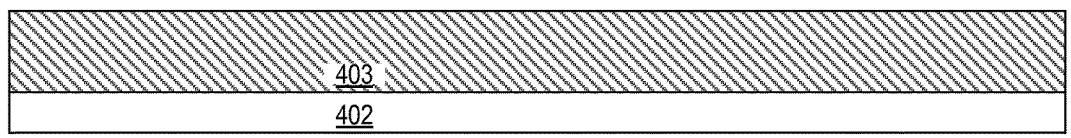

FIG. 4A illustrates an anode current collector formed adjacent to a substrate 402. The substrate 402 may be insulating so as to prevent a short circuit. In an example embodiment, the anode current collector includes a plurality of unpatterned graphene monolayers 403. The anode current collector may include a metal and may be 200-1000 nanometers thick. Other materials and thicknesses are possible. The graphene monolayers may be patterned via a lithographically-patterned etch process.

Figure 4B:
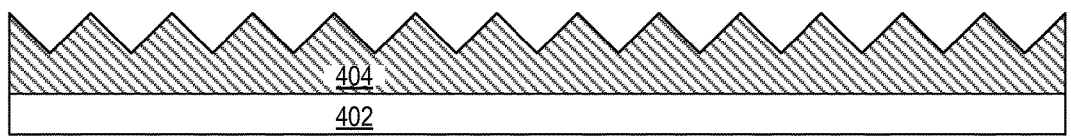

FIG. 4B illustrates a plurality of patterned graphene monolayers 404. As described above, the patterned graphene monolayers 404 may be variously shaped so as to increase a surface area between a current collector and a cathode and/or an anode.

Figure 4C:
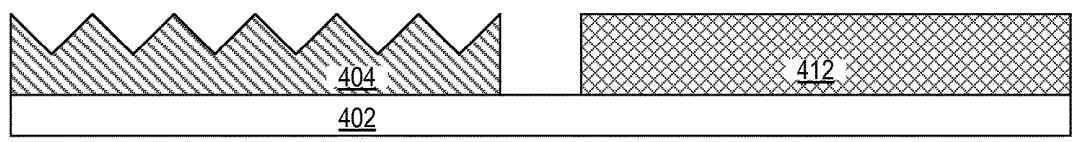

FIG. 4C illustrates a cathode current collector 412 formed adjacent to the substrate 402 following a lithographic process to remove at least some of the patterned graphene monolayers 404 (e.g. the anode current collector). Namely, a space may be formed to separate the anode current collector and the cathode current collector 412. The cathode current collector 412 may include a metal and may be 200-1000 nanometers thick. Other materials and thicknesses are possible.

Figure 4D:
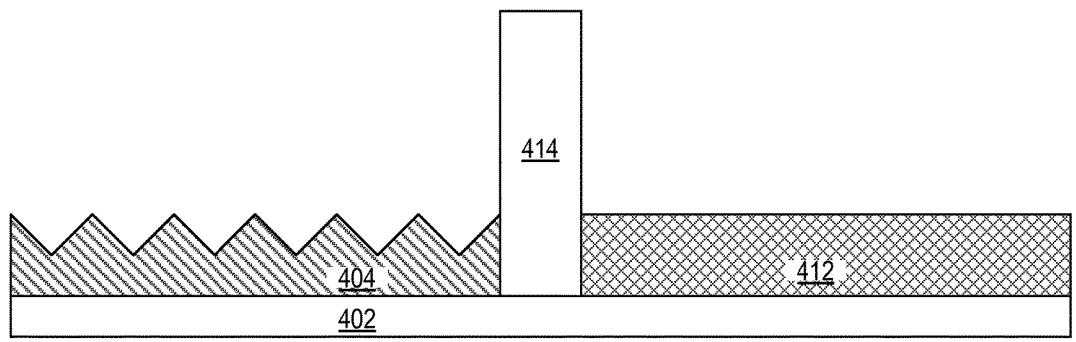
Figure 4E:
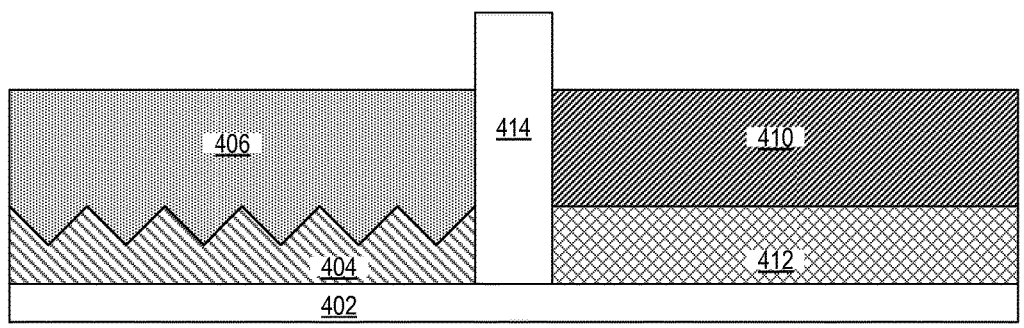

FIG. 4D illustrates an insulating material 414 formed between the anode current collector and the cathode current collector 412. FIG. 4E illustrates an anode 406 and a cathode 410 formed adjacent to their respective current collectors 404 and 412 and separated by the insulating material 414. The anode layer thickness may be between 10-30 microns, but other anode layer thicknesses are possible. The anode material may be deposited using sputtering techniques or PVD, although other deposition methods are possible. The cathode 410 may include lithium cobalt oxide ($LiCoO_2$). The thickness of the cathode may vary between 10-30 microns thick, or more. Other cathode materials are possible.

Figure 4F:
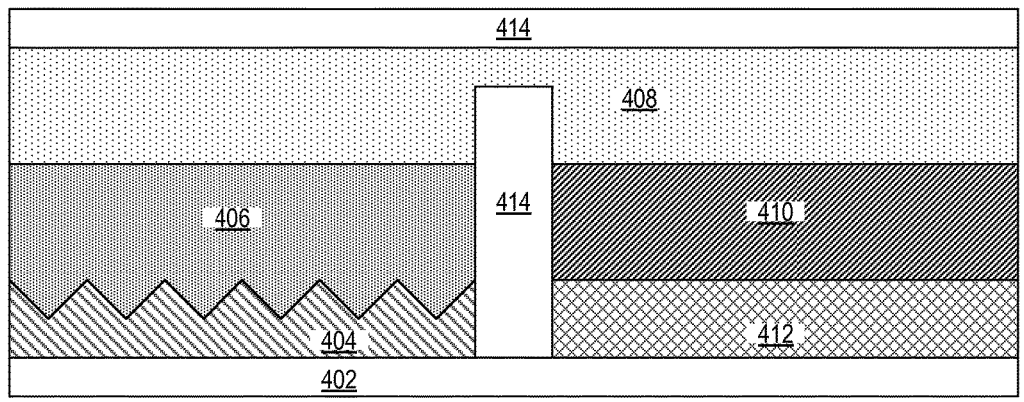

FIG. 4F illustrates an electrolyte 408 and an encapsulation layer 414. The electrolyte 408 may be formed adjacent to both the anode 406 and the cathode 410. The electrolyte layer thickness may be between 10-30 microns; however other electrolyte layer thicknesses are possible. The electrolyte layer may be formed using a magnetron sputtering system or PVD. The encapsulation layer 414 may be formed adjacent to the electrolyte 408.

The encapsulation layer 414 may include an inert and/or passivating material, such as silicon nitride (SiN). In an example embodiment, the encapsulation layer may be about 1 micron thick.

While some embodiments described herein may include additive deposition techniques (e.g. blanket deposition, shadow-masked deposition, selective deposition, etc.), subtractive patterning techniques are possible. Subtractive patterning may include material removal after deposition onto the substrate or other elements of the battery. In an example embodiment, a blanket deposition of material may be followed by a photolithography process (or other type of lithography technique) to define an etch mask. The etch mask may include photoresist and/or another material such as silicon dioxide ($SiO_2$) or another suitable masking material.

The subtractive patterning process may include an etching process. The etch process may utilize physical and/or chemical etching of the battery materials. Possible etching techniques may include reactive ion etching, wet chemical etching, laser scribing, electron cyclotron resonance (ECR-RIE) etching, or another etching technique.

In some embodiments, material liftoff processes may be used. In such a scenario, a sacrificial mask or liftoff layer may be patterned on the substrate before material deposition. After material deposition, a chemical process may be used to remove the sacrificial liftoff layer and battery materials that may have deposited on the sacrificial liftoff layer. In an example embodiment, a sacrificial liftoff layer may be formed using a negative photoresist with a reentrant profile. That is, the patterned edges of the photoresist may have a cross-sectional profile that curves inwards towards the main volume of photoresist. Materials may be deposited to form, for instance, the anode and cathode current collectors. Thus, material may be directly deposited onto the substrate in areas where there is no photoresist. Additionally, the material may be deposited onto the patterned photoresist. Subsequently, the photoresist may be removed using a chemical, such as acetone. In such a fashion, the current collector material may be "lifted off" from areas where the patterned photoresist had been. Other methods of sacrificial material removal are contemplated herein.

In some example embodiments, mechanical methods may be used to pattern the plurality of graphene monolayers. Namely, a nanoimprint lithography process may be used to emboss or imprint a desired pattern into the plurality of graphene monolayers. Other ways to pattern the plurality of graphene monolayers are possible.

Figure 5A:
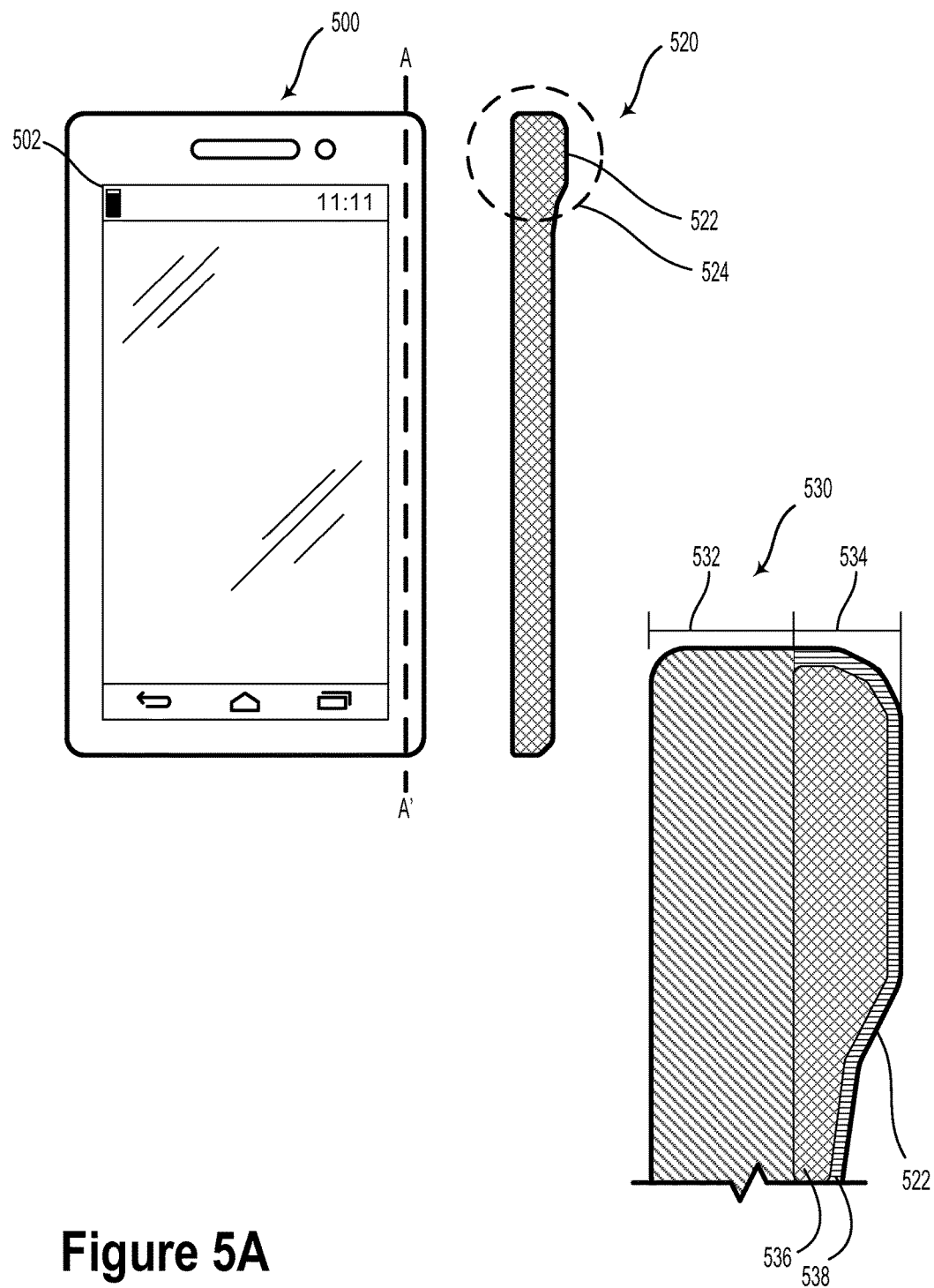
FIG. 5A illustrates front and cross-sectional views of a mobile computing device, according to an example embodiment.

FIG. 5A illustrates front and cross-sectional views of a mobile computing device 500, according to an example embodiment. The mobile computing device 500 may include a display 502. The mobile computing device 500 may be a smartphone, tablet, smartwatch, or another type of mobile computing device. A cross-sectional view 520 may represent a cross-section along line A-A' of the front view of mobile computing device 500. The cross-sectional view 520 may include a housing 522. The housing 522 may include a portion that is curved (e.g. near the edges of the mobile computing device 500). In other words, at least one surface of the battery may be curved with respect to an axis substantially perpendicular to a plurality of graphene monolayers.

Area 524 is illustrated in an enlarged view 530. Specifically, the enlarged view 530 may include a battery portion 534 and second portion 532, which may include non-battery components of the mobile computing device 500. The battery portion 534 may include some or all of the battery components described herein. For example, the battery portion 534 may include a current collector 538 and other battery components 536. The current collector 538 may include a plurality of graphene monolayers. By patterning the graphene monolayers as described elsewhere herein, the current collector 538 may take on a curved shape so as to conform to the curved housing 522.

Figure 5B:
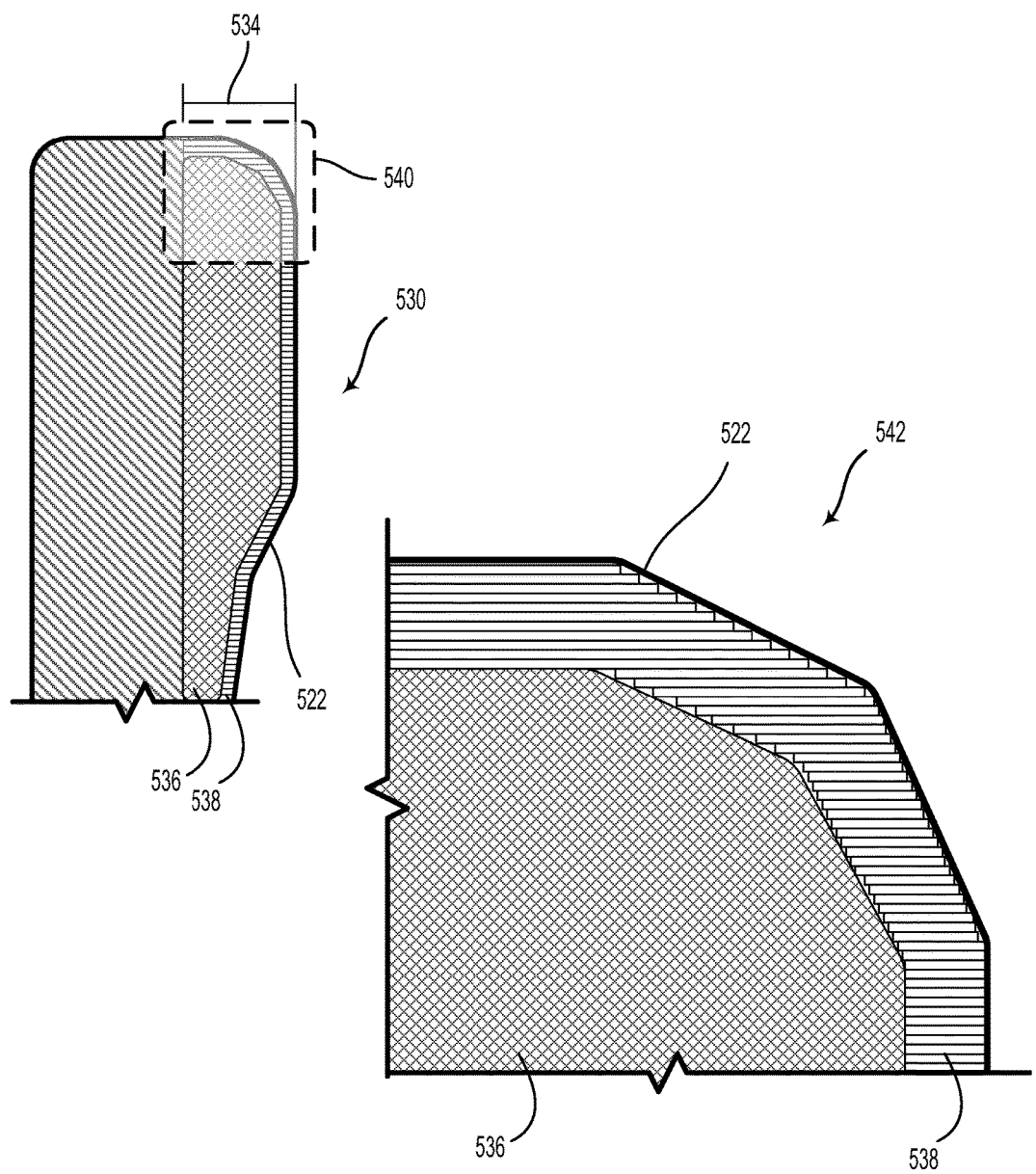
FIG. 5B illustrates cross-sectional views of a mobile computing device, according to an example embodiment.

FIG. 5B illustrates cross-sectional views of a mobile computing device 530, according to an example embodiment. Close up view 542 is a cross-sectional view of area 540 of the mobile computing device 530. Close up view 542 illustrates a curved portion of the battery portion 534 and housing 522. As described above, the battery portion 534 may include some or all of the battery components described herein, such as a cathode, an anode, a separator, and an electrolyte. Other battery components may be included in the battery portion 534. The current collector 538 includes a plurality of graphene monolayers that may be patterned so as to conform to the curved shape of the housing 522. Namely, the width of each graphene monolayer "step" may be controlled and/or adjusted. By growing, assembling, arranging, and/or combining a plurality of the graphene monolayers, a curved surface of the current collector 538 may be formed.

By conforming to the shape of the current collector 538 to shape of the housing 522, thermal conductivity between the battery and housing 522 (which may act, at least in part, as a heat sink) may be improved. Furthermore, such a curved battery may reduce unused space within the housing 522. Other benefits may be evident as a result of providing a curved battery by patterning a plurality of graphene monolayers that make up the current collector 538.

Figure 6:
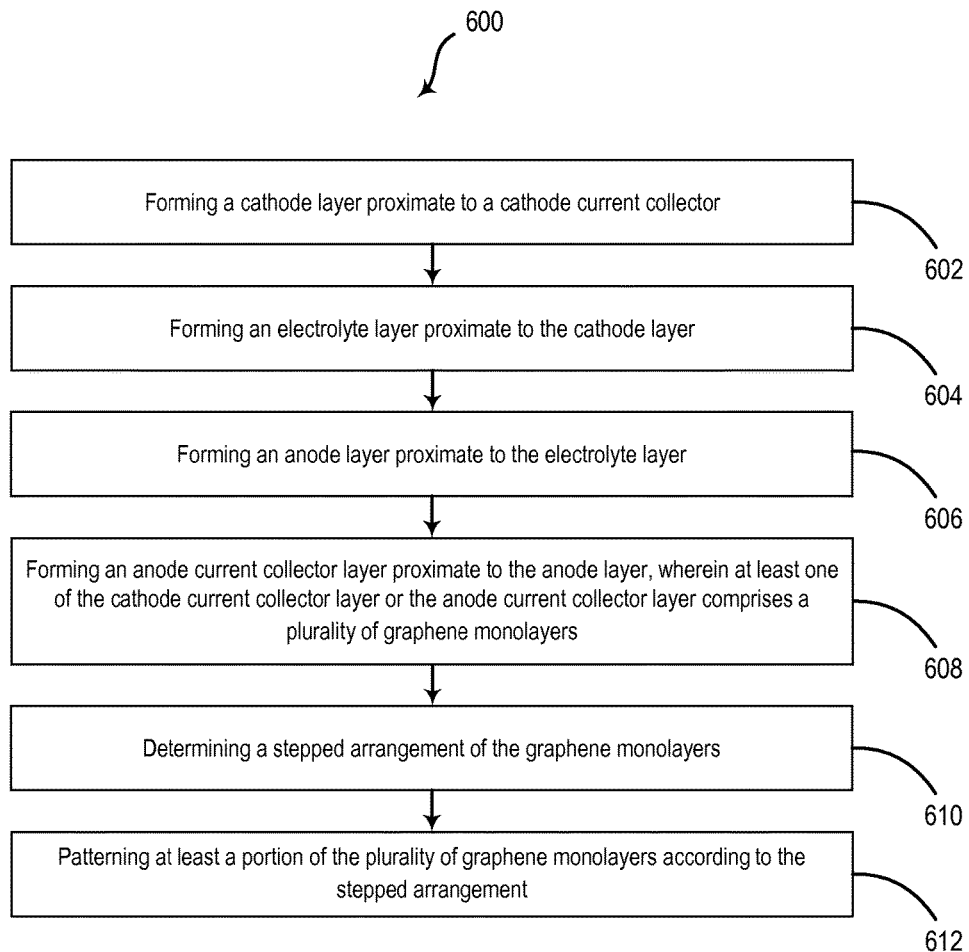
FIG. 6 illustrates a method, according to an example embodiment.

FIG. 6 illustrates a method, according to an example embodiment. The method 600 may include various blocks or steps. The blocks or steps may be carried out individually or in combination. The blocks or steps may be carried out in any order and/or in series or in parallel. Further, blocks or steps may be omitted or added. The method 600 may include blocks similar or identical to those illustrated and described with respect to methods 300 and 400 in FIGS. 3A-3H and 4A-4F, respectively.

Block 602 includes forming a cathode layer proximate to a cathode current collector. Block 604 includes forming an electrolyte layer proximate to the cathode layer. Block 606 includes forming an anode layer proximate to the electrolyte layer.

Block 608 includes forming an anode current collector layer proximate to the anode layer. As described elsewhere herein, at least one of the cathode current collector layer or the anode current collector layer includes a plurality of graphene monolayers.

Block 610 includes determining a stepped arrangement of the graphene monolayers. Determining the stepped arrangement of the graphene monolayers may include determining a desired shape, surface area, or current density. For example, it may be desirable to pattern the graphene monolayers to have a given shape. In such a scenario, determining the stepped arrangement may include designing and/or producing lithography masks, which may be used in forming the stepped arrangement of graphene monolayers.

Alternatively or additionally, determining the stepped arrangement may include designing and/or adjusting one or more fabrication steps in order to pattern the stepped arrangement of graphene monolayers. For example, if an undercut profile is desirable, an etching process step may be adjusted so as to provide an isotropic etch profile (e.g. via a wet chemical etch instead of a dry plasma etch).

In some embodiments, determining the stepped arrangement of the graphene monolayers may include determining a desired current density of the battery during at least one of a charge mode or a discharge mode. Alternatively, determining the stepped arrangement of the graphene monolayers may include determining a desired contact resistance of a respective current collector.

Yet further, determining the stepped arrangement may include determining a desired surface area or sidewall angle of the graphene monolayers with respect to a major plane of the graphene monolayers. For instance, a desired surface area may include an interfacial surface area two times the amount of a similar interface on a planar (unpatterned) graphene surface. Alternatively, a desired sidewall angle may include a 45 degree angle with respect to the major plane of the plurality of graphene monolayers. Other ways to determine the stepped arrangement of graphene monolayers may be possible.

Block 612 includes patterning at least a portion of the plurality of graphene monolayers according to the stepped arrangement. Patterning the graphene monolayers may include causing various lithography and etch processes to occur. As described elsewhere herein, a wide variety of semiconductor micro- and nanofabrication processing techniques are contemplated to form the stepped arrangement on the graphene monolayers.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A method of manufacturing a battery, the method comprising:

forming a cathode layer proximate to a cathode current collector;

forming an electrolyte layer proximate to the cathode layer;

forming an anode layer proximate to the electrolyte layer;

forming an anode current collector layer proximate to the anode layer, wherein at least one of the cathode current collector layer or the anode current collector layer comprises a plurality of graphene monolayers;

determining a stepped arrangement of the graphene monolayers; and patterning at least a portion of the plurality of graphene monolayers according to the stepped arrangement.

2. The method of claim 1, wherein the plurality of graphene monolayers is initially formed proximate to a substrate comprising copper foil.

3. The method of claim 1, wherein the stepped arrangement provides a higher surface area to volume ratio at an interface between a patterned portion of the plurality of graphene monolayers and at least one of the cathode layer or the anode layer compared to a surface area to volume ratio at an interface between an unpatterned portion of the plurality of graphene monolayers and the at least one of the cathode layer or the anode layer.

4. The method of claim 3, wherein determining the stepped arrangement of the graphene monolayers comprises determining a desired surface area to volume ratio at the interface between the patterned portion of the plurality of graphene monolayers and at least one of the cathode layer or the anode layer.

5. The method of claim 4, wherein determining the desired surface area to volume ratio at the interface comprises calculating, using a computer, the desired surface area to volume ratio based at least on a desired current density of the battery during at least one of a charge mode or a discharge mode.

6. The method of claim 1, wherein patterning the portion of the plurality of graphene monolayers comprises forming the stepped arrangement via a process comprising electron beam lithography and etching.

7. The method of claim 1, wherein patterning the portion of the plurality of graphene monolayers comprises forming the stepped arrangement via a nanoimprint lithography process.

8. The method of claim 1, wherein patterning the portion of the plurality of graphene monolayers comprises selectively removing the portion of the plurality of graphene monolayers via a lithographic process.

9. The method of claim 1, wherein at least one surface of the battery is curved with respect to an axis substantially perpendicular to the plurality of graphene monolayers.

10. The method of claim 1, wherein determining the stepped arrangement of the graphene monolayers comprises determining a desired curved shape of the plurality of graphene monolayers.

11. The method of claim 1, wherein determining the stepped arrangement of the graphene monolayers comprises determining a desired contact resistance of the at least one cathode current collector layer or the at least one anode current collector layer.

12. The method of claim 1, wherein determining the stepped arrangement of the graphene monolayers comprises determining a desired current density of the battery during at least one of a charge mode or a discharge mode.

13. The method of claim 1, wherein the battery comprises at least one of a lithium-ion battery or a lithium-polymer battery.

14. The method of claim 1, wherein the cathode layer comprises lithium cobalt oxide ($LiCoO_2$), wherein the anode layer comprises lithium metal (Li), and wherein the electrolyte layer comprises lithium phosphorous oxynitride (LiPON).

15. A battery comprising:
a cathode layer proximate to a cathode current collector layer;
an electrolyte layer proximate to the cathode layer;
an anode layer proximate to the electrolyte layer; and
an anode current collector layer proximate to the anode layer, wherein at least one of the cathode current collector layer or the anode current collector layer comprises a plurality of graphene monolayers having a stepped arrangement, wherein the stepped arrangement provides a higher surface area to volume ratio at an interface between a patterned portion of the plurality of graphene monolayers and at least one of the cathode layer or the anode layer compared to an interface between an unpatterned portion of the plurality of graphene monolayers and the at least one of the cathode layer or the anode layer, wherein at least one surface of the battery is curved with respect to an axis substantially perpendicular to the plurality of graphene monolayers.

16. The battery of claim 15, wherein the battery comprises at least one of a lithium-ion battery or a lithium-polymer battery.

17. The battery of claim 15, wherein the cathode layer comprises lithium cobalt oxide ($LiCoO_2$).

18. The battery of claim 15, wherein the anode layer comprises lithium metal (Li).

19. The battery of claim 15, wherein the electrolyte layer comprises lithium phosphorous oxynitride (LiPON).

* * * * *